United States Patent [19]

Barthel et al.

[11] Patent Number: 5,592,373
[45] Date of Patent: Jan. 7, 1997

[54] METHOD AND APPARATUS FOR CONFIGURING AN AUTOMATION SYSTEM

[75] Inventors: Herbert Barthel, Herzogenaurach; Horst Daar, Erlangen; Hartmut Schuetz, Heroldsbach, all of Germany

[73] Assignee: Siemens Aktiengesellschaft, München, Germany

[21] Appl. No.: 327,834

[22] Filed: Oct. 24, 1994

[30] Foreign Application Priority Data

Nov. 18, 1993 [EP] European Pat. Off. ............ 93118599.5

[51] Int. Cl.$^6$ .......................... G05B 19/05; G05B 19/02
[52] U.S. Cl. .............................................. 364/184; 371/26
[58] Field of Search ................................. 364/184, 185, 364/186; 371/11.1, 11.3, 26

[56] References Cited

U.S. PATENT DOCUMENTS

| | | | |
|---|---|---|---|
| 4,377,000 | 3/1983 | Staab | 371/11.1 |
| 4,695,946 | 9/1987 | Andreasen et al. | 395/183.07 |
| 4,701,630 | 10/1987 | Annunziata et al. | 364/186 |
| 4,774,709 | 9/1988 | Tulplue et al. | 371/11.1 |
| 4,851,985 | 7/1989 | Burror et al. | 364/184 |
| 4,922,491 | 5/1990 | Coale | 371/16.1 |
| 5,001,714 | 3/1991 | Stark et al. | 371/26 |
| 5,089,984 | 2/1992 | Struger et al. | 395/650 |
| 5,276,630 | 1/1994 | Baldwin et al. | 364/186 |

Primary Examiner—Paul P. Gordon
Attorney, Agent, or Firm—Kenyon & Kenyon

[57] ABSTRACT

The present invention provides a method and apparatus for flexibly configuring an automation system for a technical process. The invention permits a user to determine a configuration for one or more peripheral channels of the automation system based on desired fault behaviors. In one embodiment of the invention, a user is prompted to specify a peripheral channel of the automation system to be configured, along with a required fault behavior for that peripheral channel. In other words, the user must specify how the peripheral channel is to handle the occurrence of a fault. Once the required fault behavior is identified, a programming unit accesses a knowledge base of stored configurations and associated fault behaviors to identify a configuration meeting the user-specified requirements. The programming unit then communicates instructions for configuring the peripheral channel to a user and/or actually configures a programmable controller of the automation system.

16 Claims, 11 Drawing Sheets

METHOD AND APPARATUS FOR CONFIGURING AN AUTOMATION SYSTEM

BACKGROUND OF THE INVENTION

The present invention relates to the automation of technical systems; and in particular, to a method and apparatus for flexibly configuring an automation system according to user-selected fault detection capabilities.

In previously-known approaches to automating a technical process, the technical process and the automation system assigned to it (for example, a programmable controller) were configured on a case-by-case basis according to the needs of that particular application. Moreover, this configuration process was generally directed to handling only failures in the automation system itself, as opposed to faults in the process peripherals (that is, the peripheral channels of the technical process). This limitation held true even in those individual cases where detection of such peripheral faults was possible. Even today, no universally-applicable approach exists for handling peripheral faults, even though such faults represent by far the most common type of fault in automation.

SUMMARY OF THE INVENTION

In view of the limitations of known approaches to configuring automation systems, the present invention provides a means for flexibly configuring an automation system to exhibit a desired level of fault detection and/or fault correction capability. The invention applies an approach whereby the user (that is, the person configuring the automation system) is freed from having to define a specific configuration for a given peripheral channel. Instead, the user need only select a desired functionality for the peripheral channel, such as a specific fault behavior which the user desires the peripheral channel to exhibit. By enabling the user to select a desired fault behavior, the operational reliability of both the automation system and the technical process being automated are significantly increased.

In general terms, a method of configuring an automation system for a technical process according to the present invention involves the following steps. First, a user identifies to a programming unit at least one peripheral channel of the technical process being automated. Next, the user specifies a fault behavior required when a given fault occurs in that peripheral channel. Given this information, the programming unit uses a knowledge base to determine which of a number of predefined configurations of the peripheral channel will provide the fault behavior desired by the user. Finally, the programming unit provides the user with instructions for implementing the appropriate predefined configuration.

In one embodiment of the present invention, the programming unit displays a number of available fault behaviors to the user in response to the user specifying a particular peripheral channel. These different fault behaviors may offer a range of fault detection and/or fault correction capabilities, with a corresponding range of cost and/or technical complexity. The user may then select the fault behavior which best satisfies the fault behavior requirements for that peripheral channel. In this way, the user can define a configuration for the peripheral channel having a required fault behavior in a very simple manner. Analogously the programming unit could display a number of possible configurations for the peripheral channel that will provide the fault behavior specified by the user.

The present invention is also useful in reducing the time required to automate a technical process. In general, the automation of a technical process will require a plurality of supporting peripheral channels. The time required for configuration can therefore be considerably reduced by grouping together multiple peripheral channels so that specification of a desired fault behavior can be done only once and applied across the multiple peripheral channels. In certain implementations, it may also be possible to select a configuration that can apply to multiple peripheral channels.

Features and advantages of the present invention are described below in the context of preferred embodiments, with reference to the drawing figures. Other features and advantages will be readily apparent to persons skilled in the art.

DETAILED DESCRIPTION

Figure 1:
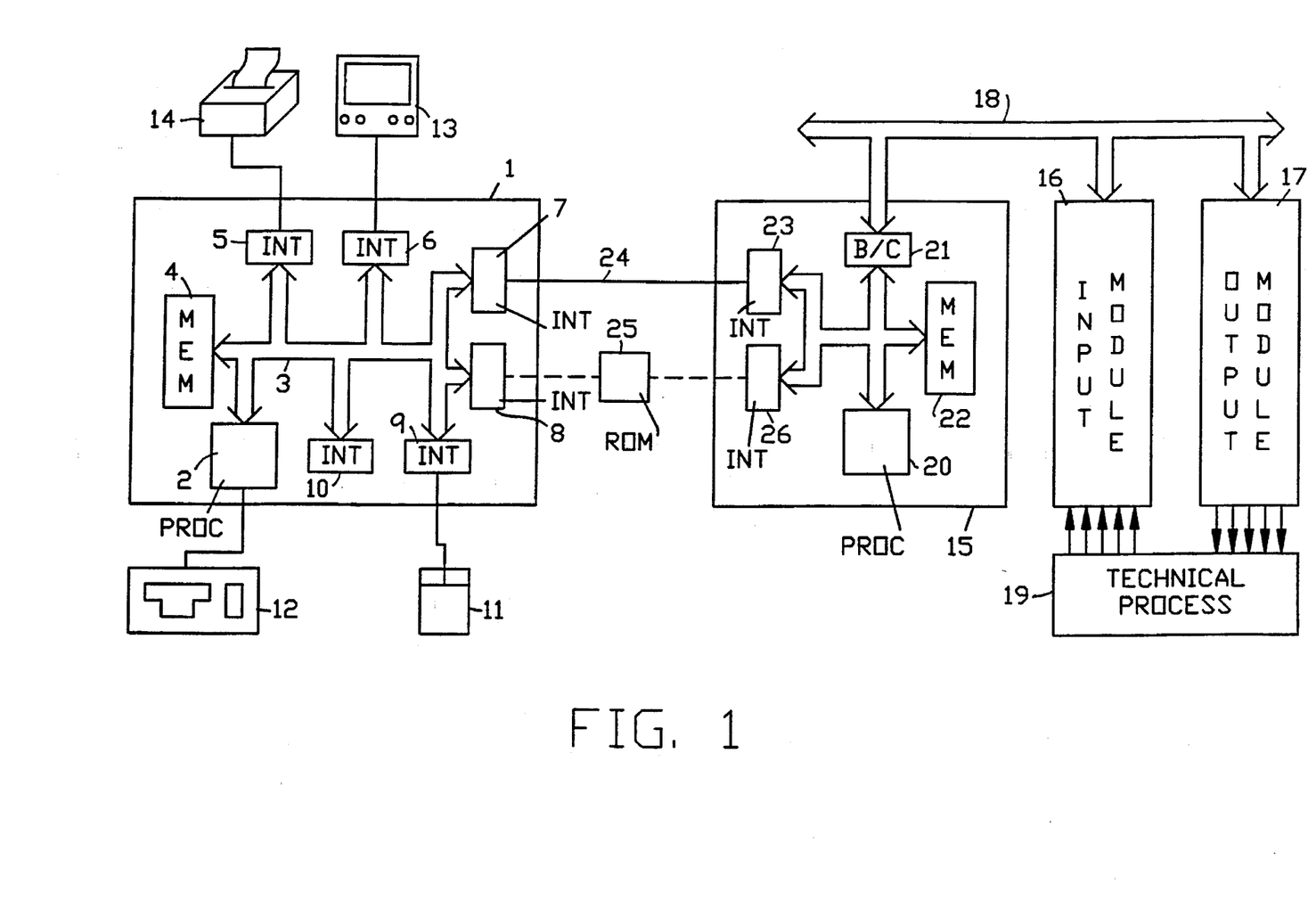
FIG 1 is a block diagram of an apparatus for configuring an automation system for a technical process according to the present invention.

FIG. 1 illustrates an approach to automating a technical process 19 according to the present invention. In the embodiment shown in FIG. 1, an automation device, such as a programmable controller, includes a central unit 15 coupled to at least one input module 16 and at least one output module 17 across a bus 18. Bus 18 may be used to report signals from the technical process 19 to the central unit 15 using the input module 16. Similarly, signals from the central unit 15 can be communicated to the technical process 19 through the output module 17.

The central unit 15 may include several other components, as shown in FIG. 1. For example, the central unit 15 has a processor 20 which communicates with the input module 16 and the output module 17 using a bus controller 21. The processor 20 also includes a user-generated program stored in a memory 22, which program provides the logic by which the processor 20 processes input signals from the input module 16 and generates output signals to be transmitted to the output 1nodule 17. Finally, the central unit 15 may have one or more interfaces 23 and 26 which facilitate communications between the central unit 15 and other devices.

In order to provide a user with the ability to flexibly configure the automation system according to the present invention, the embodiment illustrated in FIG. 1 includes a programming device 1. This programming device 1 includes a processor 2 coupled to a memory 4 and a plurality of interface modules 5 through 10 across a bus 3. In this particular embodiment, a mouse 11 and a keyboard 12 are provided to permit a user to supply input to the programming device 1. These user input devices communicate with programming device 1 through respective interfaces 9 and 10.

The programming device 1 is further coupled to a video monitor 13 through interface 6, enabling the programming device 1 to display information to the user. Similarly, the programming device 1 is coupled to a printer 14 through interface 5 so that, for example, a user may generate a hard-copy of information provided by the programming device 1 for logging and/or archival. According to the present invention (and as will be described below), a user may employ the programming device 1 to configure the automation system for the technical process 19 by defining peripheral channels and required fault behaviors for those peripheral channels (that is, how the peripheral channel should react when a fault occurs).

Any configuration generated by the user using the programming device 1, in addition to being displayed on the monitor 13 or printed on the printer 14, must be communicated to and stored by the central unit 15. Accordingly, the programming device 1 and the central unit 15 are coupled by a cable 24 through their respective interfaces 7 and 23. Such an arrangement permits the user-generated configuration to be stored directly. Alternatively, the user-generated configuration could be written to a read-only memory 25 detachably connected to the programming device 1. For this purpose, the programming device 1 may include an interface 8 including an EPROM burner. The read-only memory 25 containing the configuration could then be coupled to the central unit 15 through interface 26 at some later time. An advantage of this arrangement is that the configuration can be generated without the need for the programming device 1 being coupled to the central unit 15.

Fault Detection for Peripheral Input Channels

Figure 2:
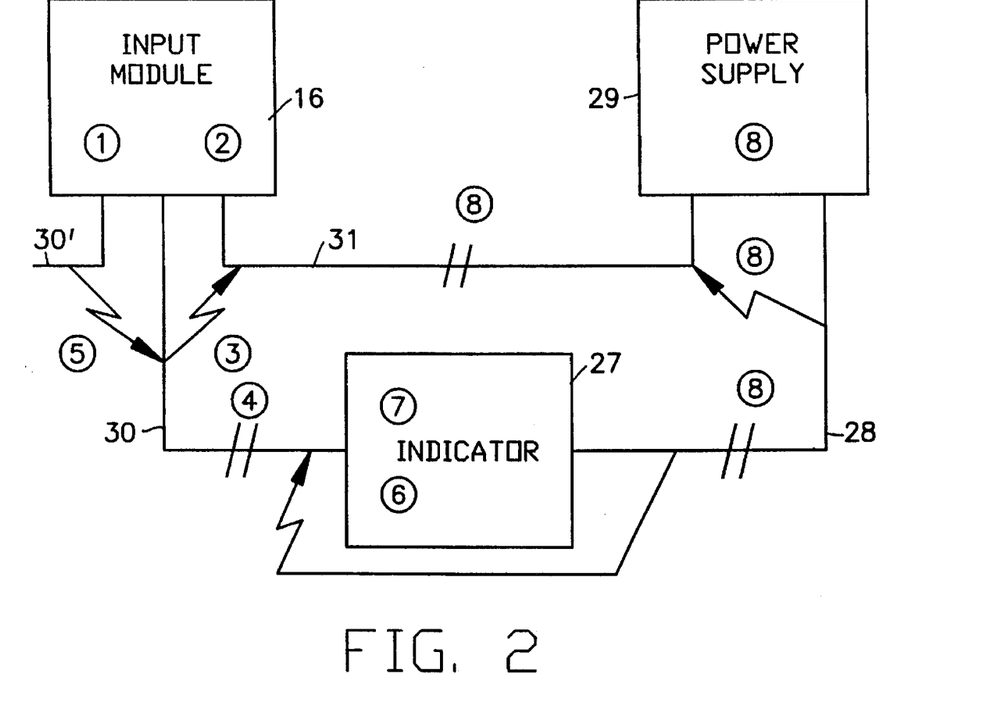
FIG. 2. illustrates a plurality of possible, faults in a peripheral input channel.

Referring now to FIG. 2, a peripheral input channel of an automation system may typically experience any of a number of different faults. The peripheral input channel illustrated in FIG. 2 is a digital channel; however, the present invention may be applied to an analog input channel with only minor changes which will be readily apparent to persons skilled in the art. During normal operation of the peripheral input channel, an indicator 27 is coupled to a load power supply 29 through a first line 28. On the output side, the indicator 27 is coupled to an input module 16 of the automation system (as shown in FIG. 1) through an indicator signal line 30. In addition, both the input module 16 and the load power supply 29 have their ground connections coupled through a third line 31. As noted above, this wiring arrangement represents the normal operation of the peripheral input channel. Unfortunately, it is not unusual for faults to occur which cause the peripheral input channel to deviate from its normal operation.

FIG. 2 identifies by number a variety of faults which commonly occur in a peripheral input channel of the type shown. These faults include:

(1) the input module 16 can fail such that it always reads a binary one ("on") signal from the indicator 27 regardless of the signal that is actually supplied to the indicator 27;

(2) the input module 16 can fail such that it always reads a binary zero ("off") signal from the indicator 27 regardless of the signal that is actually supplied to the indicator 27;

(3) the indicator signal line 30 can be short-circuited to ground:

(4) the indicator signal line 30 can be interrupted:

(5) the indicator signal line 30 can be short-circuited to another indicator signal line 30';

(6) the indicator 27 can be internally short-circuited;

(7) the indicator 27 can be internally interrupted: and (8) the load power supply 29 can be interrupted (this may happen if either the line 28 or the line 31 is interrupted, or if the lines 28 and 31 are short-circuited together).

This fault numbering scheme will apply hereafter for all input channel configurations.

Of the faults depicted in FIG. 2, the so-called "dangerous" faults are (1), (5) and (6). As a result of any of these faults, the input module 16 may incorrectly read a binary one even though a binary zero is actually present. Thus, it is absolutely critical to detect faults of this type in any safety-related application.

Figure 3:
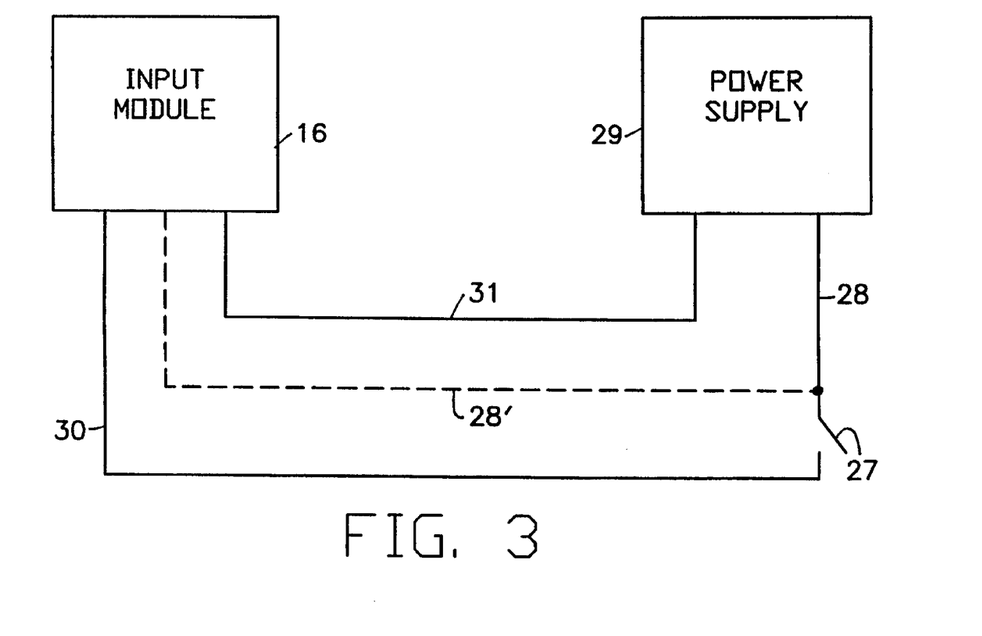
FIGS. 3,4,5,6,7,8,9,10,11,12,13,14,15,16 illustrate different configurations of a peripheral input channel for handing one or more of the faults shown in FIG. 2

FIG. 3 illustrates the most basic configuration of an input channel, consisting of only a single indicator 27. This configuration enables neither fault detection nor fault localization. However, if the load voltage present on the line 28 were fed directly to the input module 16 across the line 28' (as shown by the dashed line), this configuration could at least detect a failure of the load power supply 29.

Figure 4:
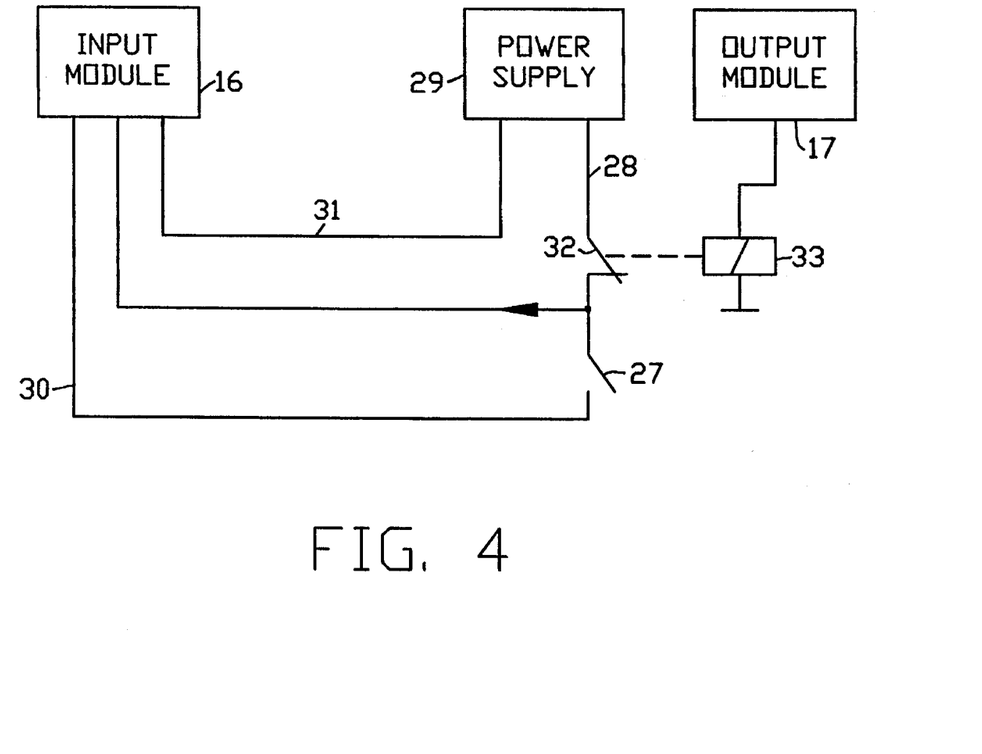

FIG. 4 illustrates a configuration for an input channel in which a switch 32 is looped into the line 28, which switch can be actuated via the output module 27 and a relay 33. Such a configuration enables detection or faults (1) and (5) at any time through appropriate triggering of the switch 32. In addition, fault (3) may be detected after triggering the indicator 27 (that is, after closing the circuit). As is apparent, the fault is also localized upon detection.

Figure 5:
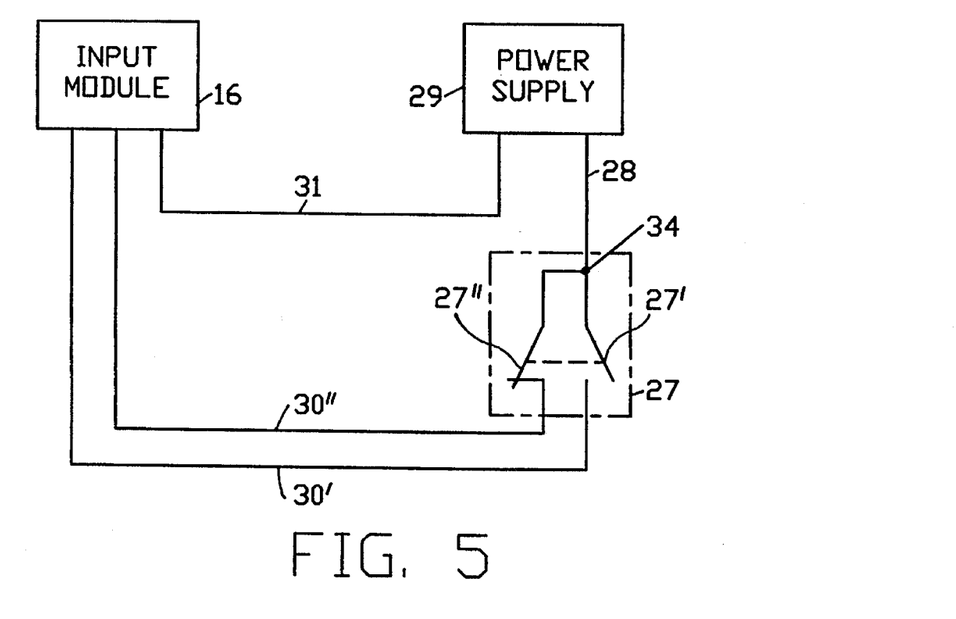

The configuration illustrated in FIG. 5 offers a high degree of safety at a relatively low cost. In this configuration, the indicator 27 is designed as an exclusive-OR indicator. That is, the indicator 27 includes two indicator branches 27', 27", with the indicator branch 27' supplying a zero signal when the indicator branch 27" supplies a one signal, and vice versa. The output signals of the two indicator branches 27', 27" are fed to two inputs of the input module 16 across respective lines 30', 30". Using this relatively simple structure, each of the faults (1) through (8) can be detected. At the latest fault detection will occur following an edge transition; however, in some circumstances fault detection may occur earlier. This will always hold true, except in the rather improbable case where both indicator branches 27', 27" suffer a mechanical failure. Indeed, even an interruption of the line 28 at a point downstream of the fork 34 can be detected following an edge transition at the latest.

A drawback of the configuration of FIG. 5 is that fault localization is not possible. That is, this configuration does not permit determination of which of the two indicator branches 27', 27" is detective. Nonetheless, this configuration's ability to detect all faults using the exclusive-OR indicator 27 (assuming both indicator branches 27', 27" do not mechanically fail) makes it well-suited for many different applications.

Figure 6:
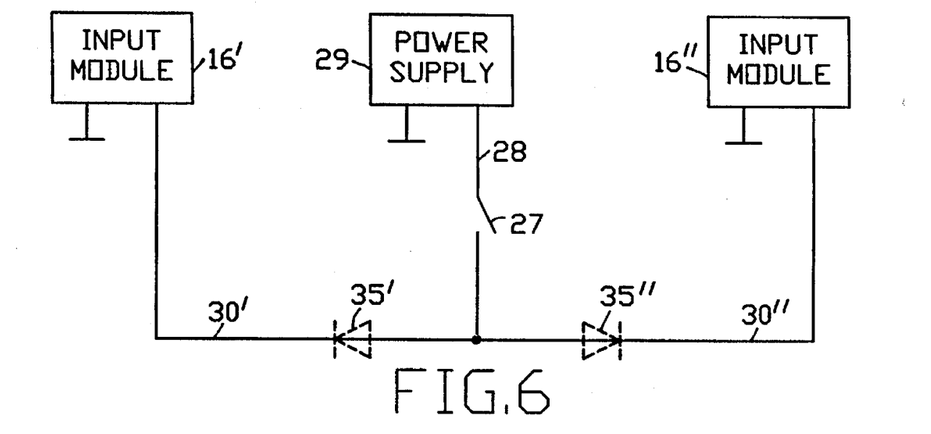

Referring now to FIG. 6, detection of faults (1), (2) and (4) is possible if the output signal of the indicator 27 is fed to two different input modules 16', 16" by separate lines 30', 30". Moreover, modifying this configuration slightly by connecting diodes 35', 35" into the lines 30', 30" will enable detection of fault (5), at the latest following an edge transition of the signal supplied by the indicator 27.

Figure 7:
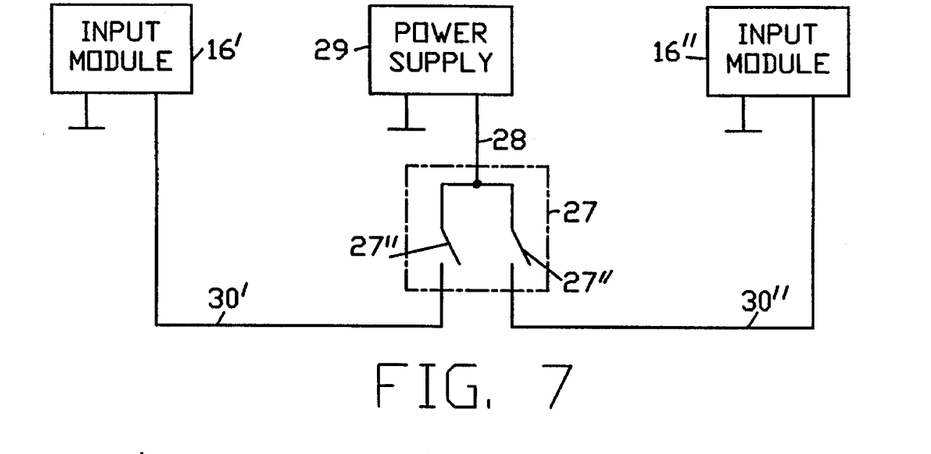
Figure 8:
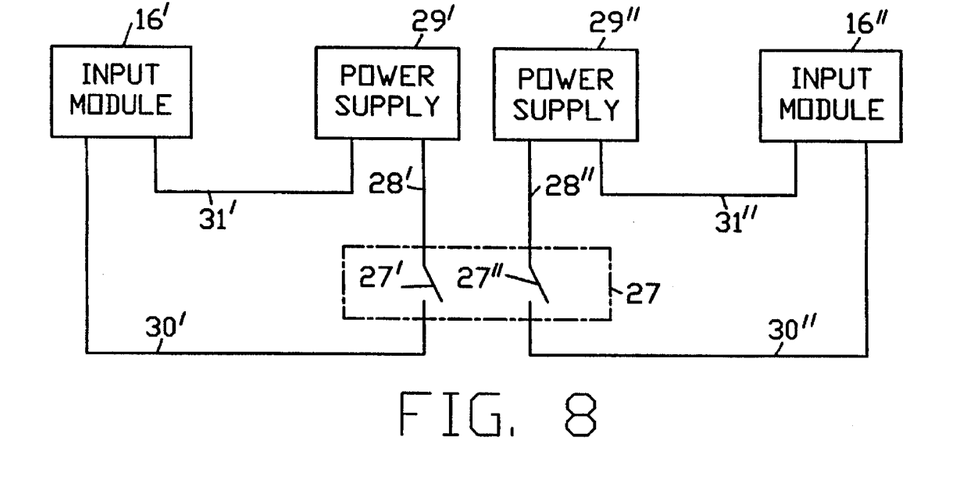

In the configuration of FIG. 7, the indicator 27 consists of two identically-triggered indicator branches 27', 27" having output signals which are respectively fed to separate input modules 16', 16". With the exception of fault (3), each of the fault (1) through (7) can be detected at the latest following an edge transition of the signal supplied by the indicator 27. However, like the configuration of FIG. 5, the fault cannot be localized. Similarly, the configuration of FIG. 8 enables detection of each of the faults (1) through (8), at the latest following an edge transition of the signal supplied by the indicator 27, but the fault cannot be localized.

Figure 9:
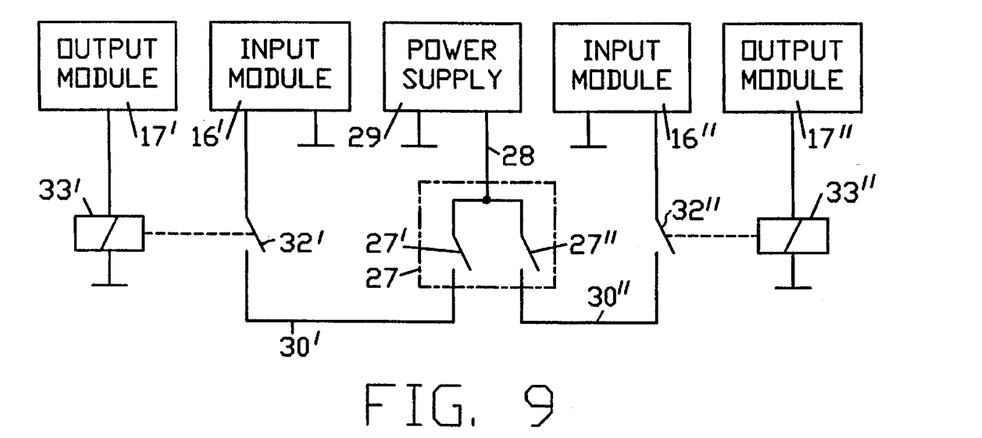

FIG. 9 illustrates a configuration using a dual indicator 27, wherein the output signals supplied by the two indicators 27', 27" are fed to two different input modules 16', 16" across respective lines 30', 30" In addition, respective switches 32', 32" are looped into the lines 30', 30", and are actuated by test relays 33', 33" from respective output modules 17', 17" separated from one another. Like the configuration of FIG. 7, each of the faults (1) through (7) can be detected with the exception of fault (3). As before, these faults will be detected following an edge transition at the latest (that is, after triggering of the indicator 27). In addition, this configuration enables faults (1), (2), (4) and (7) to be localized as a result of the switches 32', 32" and the test relays 33', 33".

Figure 10:
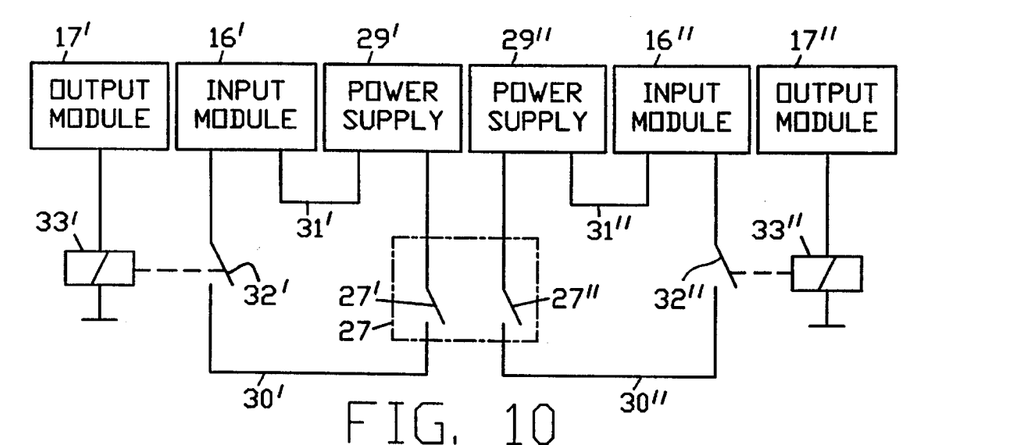

In contrast to the configuration of FIG. 9, the configuration illustrated in FIG. 10 includes two separate load power supplies 29', 29" instead of a common load power supply 29. This configuration enables each of the faults (1) through (8) to be detected at the latest following an edge transition. Furthermore, with the exception of faults (5) and (6), each of the faults can also be localized.

Figure 11:
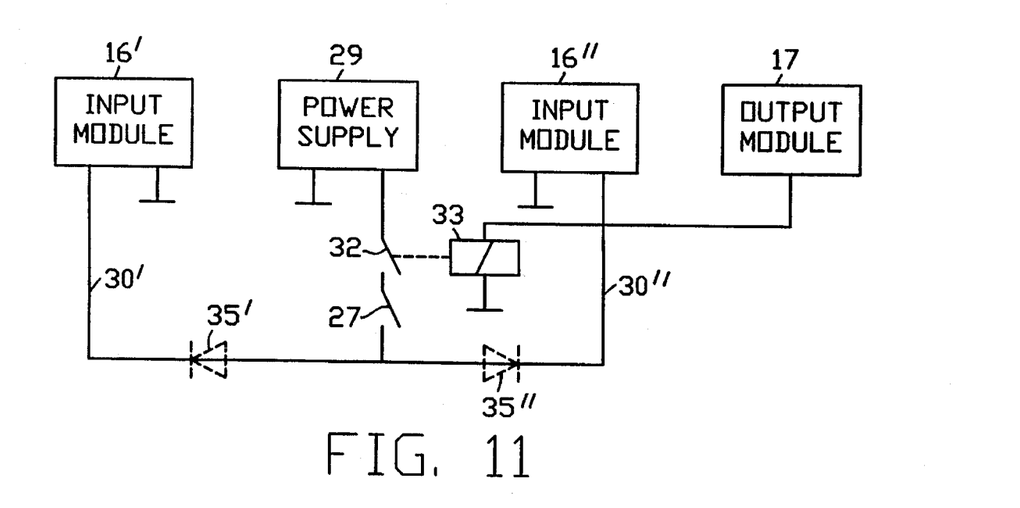
Figure 12:
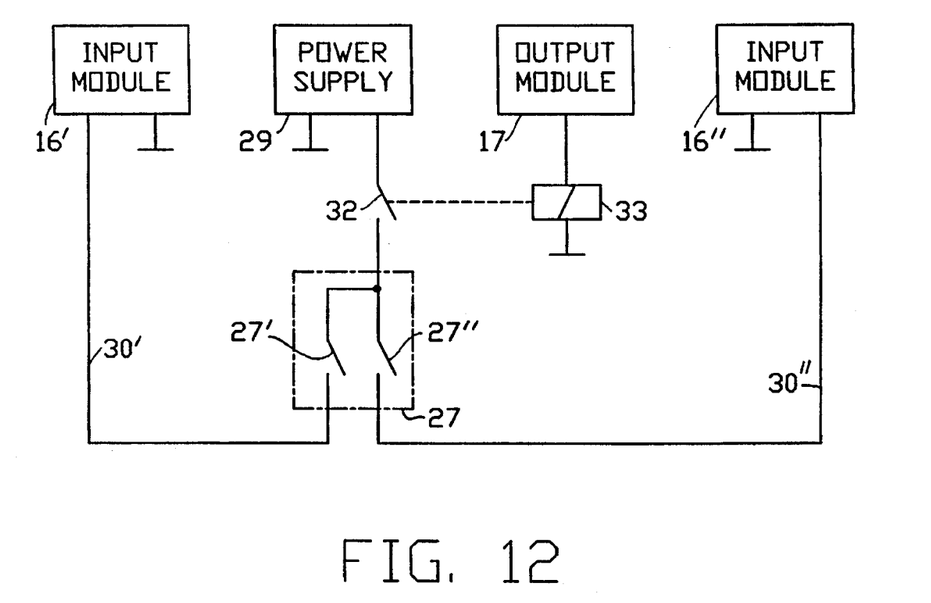

Referring now to FIG. 11, a test relay 33 is coupled along with a switch 32 between a load power supply 29 and an indicator 27. This configuration enables both detection and localization of faults (1), (2) and (4) following an edge transition. In addition, looping diodes 35', 35" into the respective branches to the input modules 16', 16" (as shown by dashed lines) will enable fault (5) to be detected and localized using discrepancy analysis. As shown in FIG. 12, this configuration can be modified slightly to include a dual indicator 27 having two indicator branches 27', 27" instead of the basic indicator 27 of FIG. 11. This modification enables detection of each of the faults (1) through (7), with the exception of fault (3). Moreover, with the exception of fault (6), each of the detectable faults can also be localized.

Figure 13:
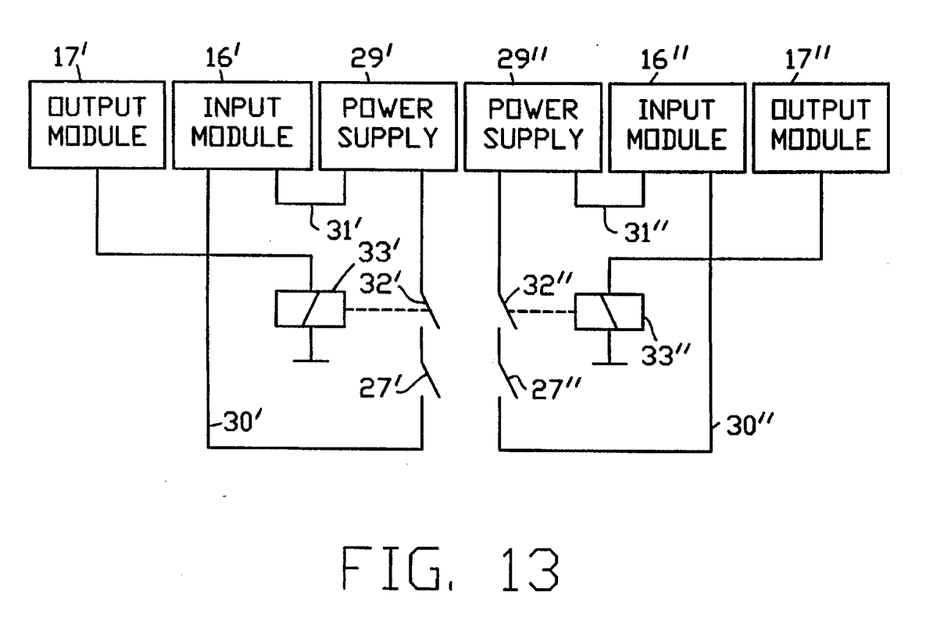

According to the configuration shown in FIG. 13, two separated indicators 27', 27" are fed to two separate input modules 16', 16". In addition, switches 32', 32" are looped into the lines between the respective load power supplies 29', 29" and the indicators 27', 27" which switches 32', 32" can be triggered by respective relays 33', 33". This configuration enables detection of each of the faults (1) through (8). Furthermore, other than fault (6), each of the faults can also be localized.

Figure 14:
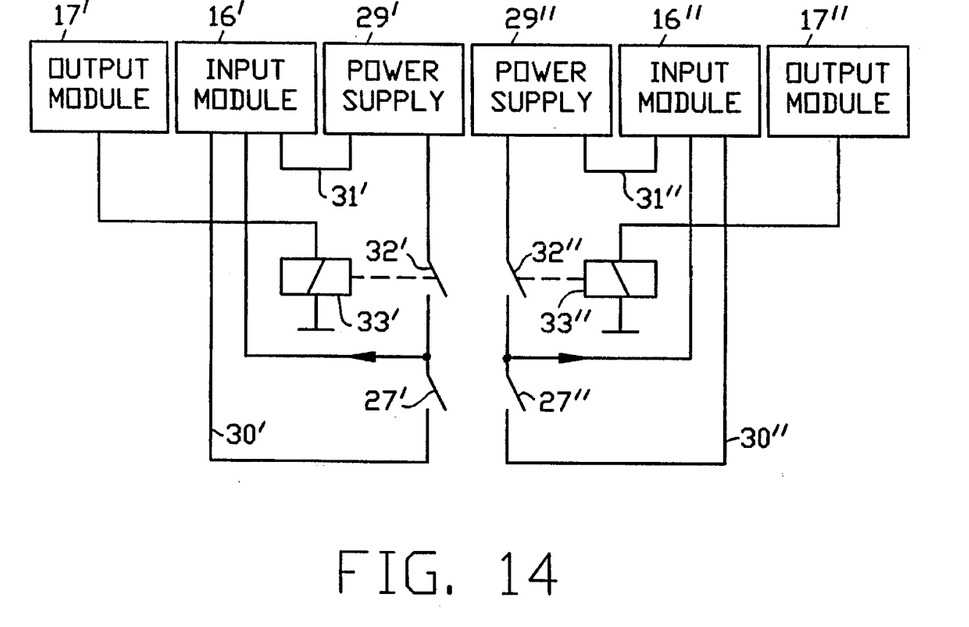
Figure 15:
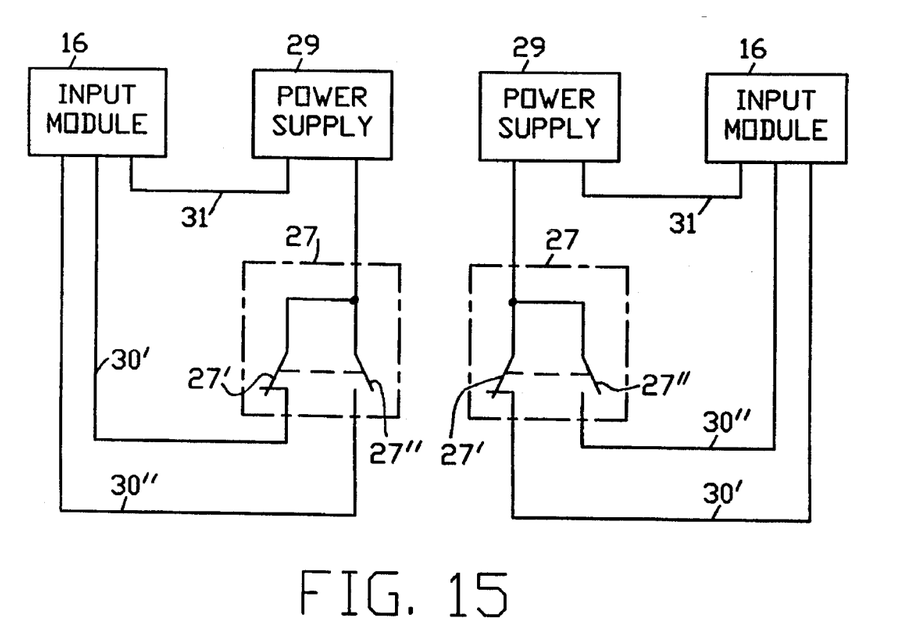

The configuration of FIG. 13 may be modified slightly as shown in FIG. 14, such that the signals present at the inputs of the indicators 27', 27" are also read into the respective input modules 16', 16". As a result of this additional measure, a failure of the load power supplies 29', 29" can be detected even when the indicators 27', 27" properly supply a zero signal. In such a case, the fault (8) can also be localized.

Turning now to FIG. 14, the illustrated configuration is essentially a parallel arrangement of two configurations according to FIG. 5. Using this configuration, each of the faults (1) through (8) can be both detected and localized, following an edge transition. The sole exception occurs when both branches of either one of the indicators 27 suffer a mechanical failure, in which case the faults (6) and (7) cannot be localized.

Figure 16:
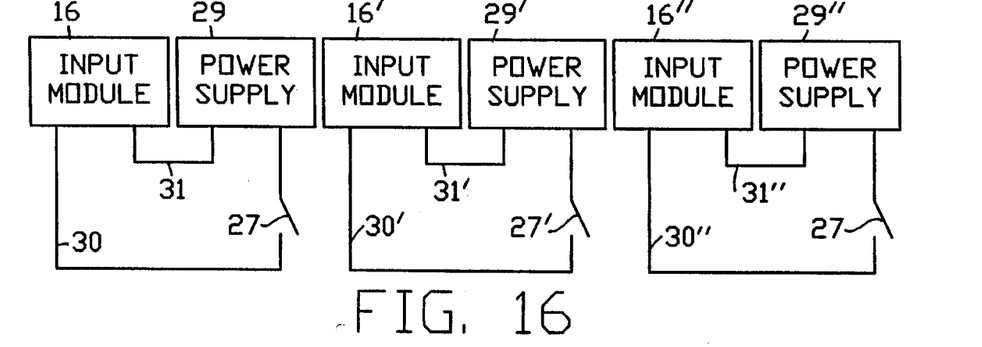

Finally, FIG. 16 illustrates a configuration corresponding to a parallel arrangement of three of the structures shown in FIG. 3. Of all the configurations shown, this one is the most reliable. It can be used to detect and localize each of the faults (1) through (8) at the latest following an edge transition.

The configurations shown in FIGS. 3–16 are merely intended to be exemplary of the types of configurations that may be used according to the present invention. Many more configurations are possible in practice. Referring back to FIG. 1, the programming unit 1 will store all of the configurations defined to it in the memory 4 along with their corresponding fault behaviors (that is, a listing of the faults which can be detected and/or localized).

Fault Detection for Peripheral Output Channels

Figure 17:
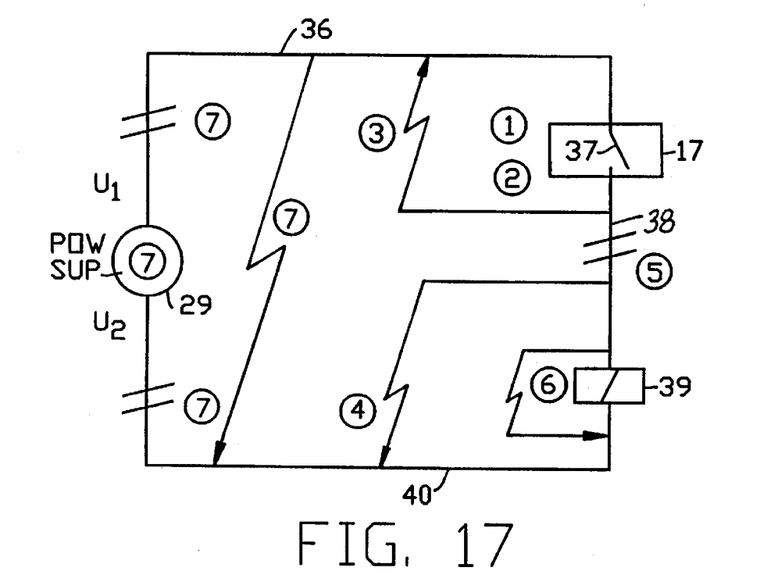
FIG. 17 illustrates a plurality of possible faults in a peripheral output channel.

FIG. 17 identifies by number some or the faults which commonly occur in a peripheral output channel 36. As before, the particular peripheral output channel 36 is digital, but the following fault detection approach can also be applied to an analog output channel with only minor changes familiar to persons of ordinary skill in the art.

In the output channel 36 of FIG. 17, a load power supply 29 provides a potential $U_1$ which is fed to an output module 17 by a line 36. Within the output module 17, the potential $U_1$ is fed to a switch 37. Depending on whether the switch 37 is closed or open, the corresponding channel outputs either a one signal or a zero signal across a line 38 to an actuator 39 which may be, for example, a relay. From the actuator 39, a line 40 leads back to the load power supply 29 at a potential $U_2$, thus closing the circuit.

As shown in FIG. 17, faults which commonly occur in a peripheral output channel of this type include:

(1) the output module 17 can tail such that the switch 37 is always closed regardless of the switch setting of the output module 17 specified by the central unit 15;

(2) the output module 17 can fail such that the switch 37 is always open regardless of the switch setting of the output module 17 specified by the central unit 15;

(3) the line 38 can be short-circuited to the potential $U_1$;

(4) the line 38 can be short-circuited to the potential $U_2$ (5) the line 38 can be interrupted;

(6) the actuator 39 may short-circuit between the line 38 and the line 40; and (7) the load power supply 29 can fail.

This fault numbering scheme will apply hereafter for all output channel configurations.

Of the faults depicted in FIG. 17, the so-called "dangerous" faults are those which incorrectly put the actuator 39 into the one state (that is, faults which inadvertently trigger the actuator 39). Faults (1) and (3) are dangerous faults. Thus, it is absolutely critical to detect these faults in any safety-related application. Likewise, a fault correction capability must be provided to switch the actuator 39 back into the non-triggered state.

The most basic possible configuration for an output channel is that shown in FIG. 17. Such an output channel provides no facilities for either detecting, localizing or correcting faults.

Figure 18:
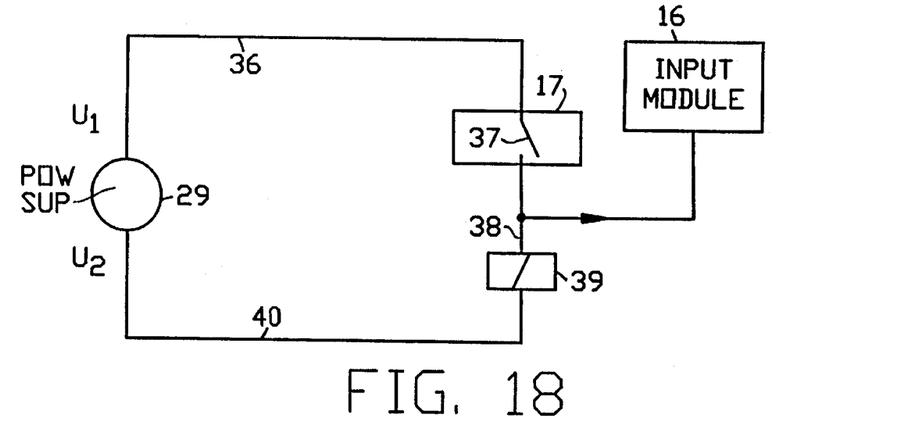
FIGS. 18,19,20,21,22,23,24 illustrate different configurations of a peripheral output channel for handling one or more of the faults shown in FIG. 17.

FIG. 18 illustrates an improvement over the basic output channel of FIG. 17. In this configuration, the potential present on the line 38 is tapped off and fed to an input module 16. With the exception of fault (5), this configuration enables detection of each of the faults (1) through (7). Moreover, due to the very simple configuration, it is also possible to localize each of the faults. On the other hand, there is no ability to alter faulty triggering of the actuator 39.

Figure 19:
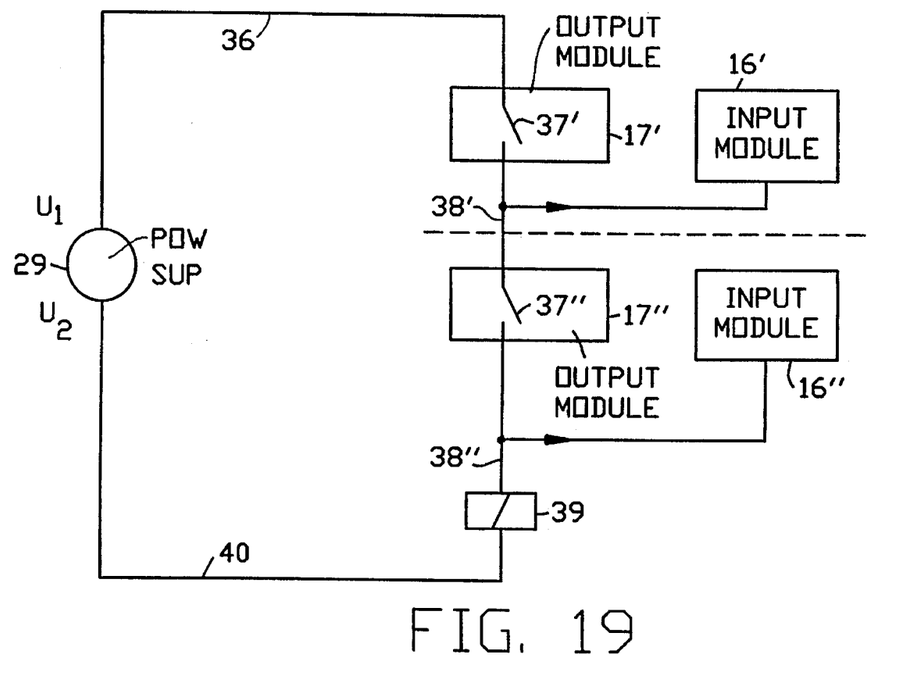

In the configuration of FIG. 19, two separate output modules 17', 17" are connected in series upstream from the actuator 39. The potentials present on the lines 38', 38" are respectively fed to separate input modules 16', 16". Using this configuration, each of the faults (1) through (7) can be detected, with the exception of fault (5). In addition, faults (1) and (2) can be localized, thus enabling a determination of which of the switches 37', 37" is defective. Furthermore, the actuator 39 can be disconnected from the potential $U_1$, in the event it is determined that one of the output modules 17', 17" is supplying a one signal when it should be supplying a zero signal.

Figure 20:
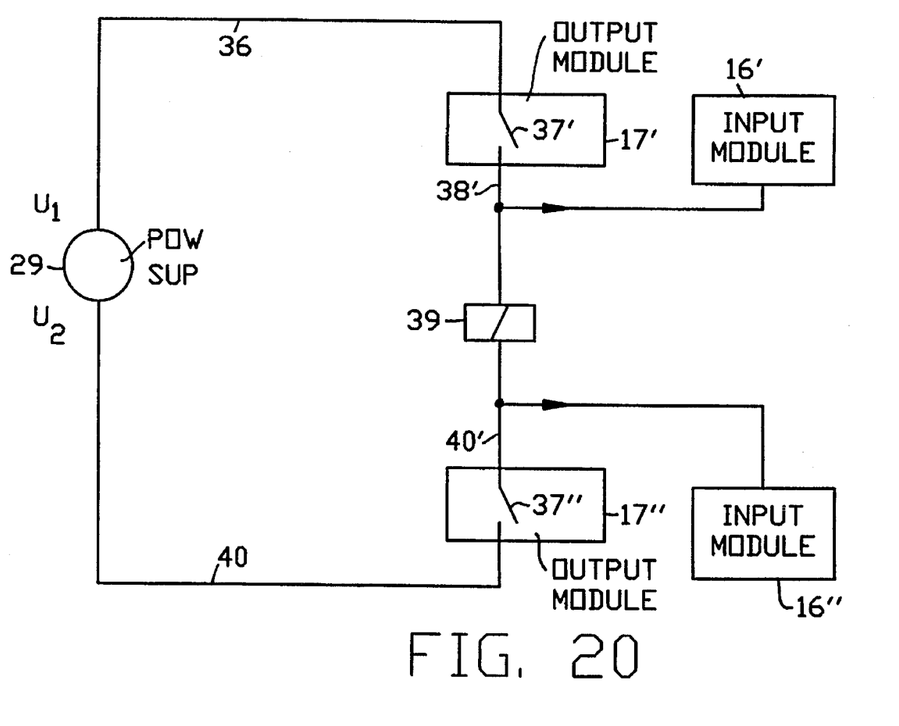

Referring now to the configuration of FIG. 20, two separate output modules 17', 17" are provided, each having a switch 37', 37" Unlike the configuration of FIG. 19, the output module 17" is arranged downstream from the actuator 39. Moreover, the potential present on the line 40' is also led back. Using this configuration, it is again possible to detect faults (1) through (7), with the exception of fault (5). Faults (1) to (4) and (7) can also be localized. In addition, in the case of faults (1) and (3), it is possible to query the switching states of the respective switches 37', 37" to detect an inequality between the two. Upon detection of such a fault, this configuration permits reliably opening the circuit using the other of the output modules 17', 17". The configuration thus makes it possible to switch the actuator 39 to a non-triggered state following a predetermined latency time T, at the latest. This configuration is therefore well-suited for safety-related applications.

Figure 21:
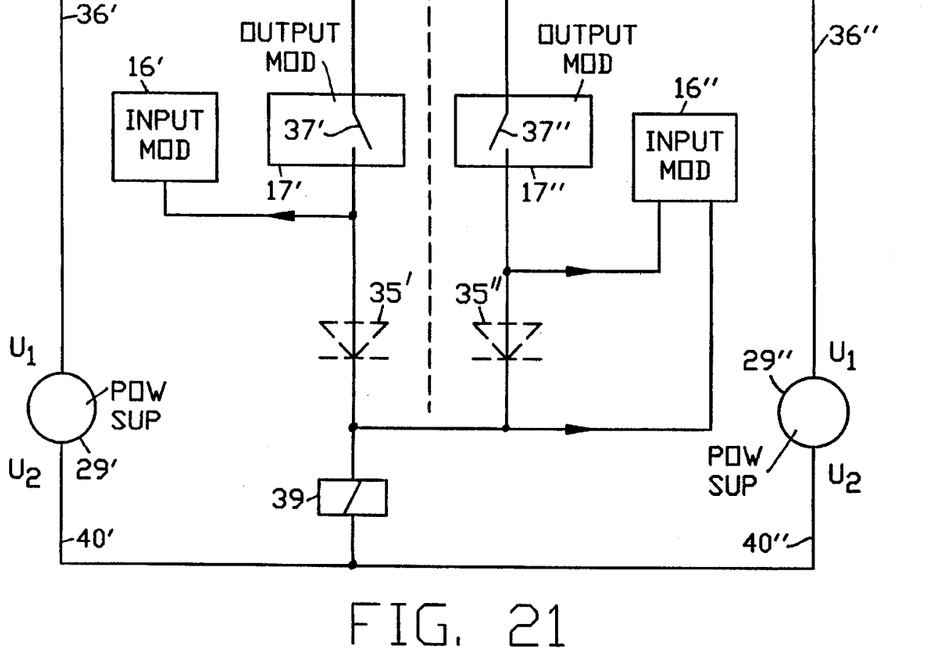

In the configuration of FIG. 21, two separate lead power supplies 29', 29" may be connected to an actuator 39 through two separate output modules 17', 17". The signal present at the input to the actuator 39 is ted to the input module 16". Using this configuration, each of the faults (1) through (7) may be detected, with the exception of fault (5). In addition, faults (2) and (7) can be localized by performing a discrepancy analysis of the signals output by the two output modules 17', 17" Furthermore, upon occurrence of fault (2), the actuator 39 can be forced to a one following a predefined latency time T at the latest.

Still referring to the configuration of FIG. 21, if the load power supplies 29', 29" supply direct current, it is desirable to supplement the configuration with diodes 35', 35" (as shown in dashed lines). Also, the signals directly downstream from the output modules 17', 17" may be tapped and fed to the respective input modules 16', 16" These modifications will enable fault (1) to be localized.

Figure 22:
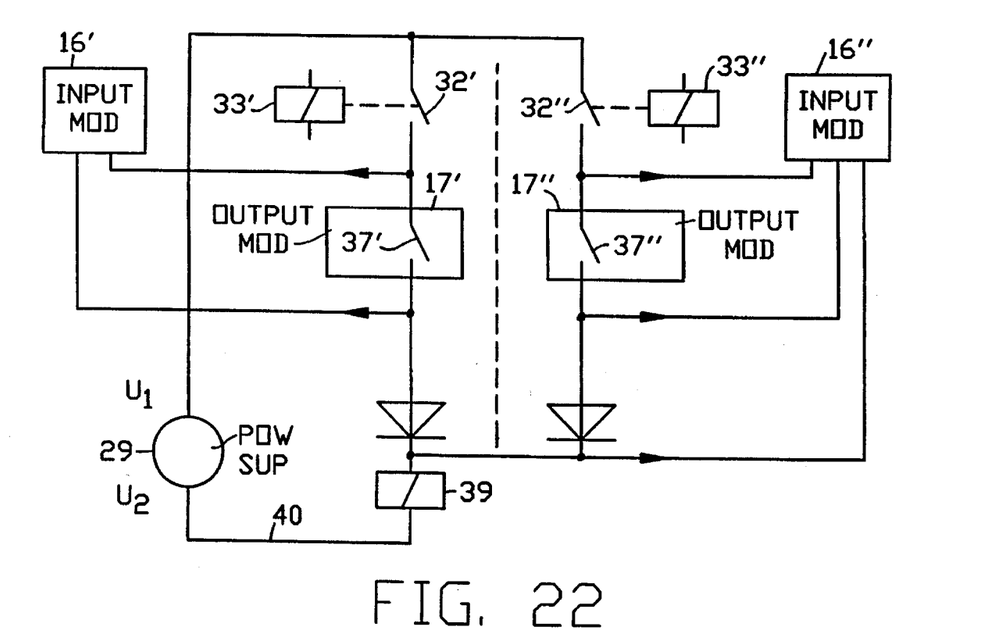

Turning now to FIG. 22, an actuator 39 is connected in parallel to a potential $U_1$ through two switches 32', 32". These switches 32', 32", which can be actuated by respective relays 33', 33", are arranged between two other switches 37', 37" and the load power supply 29. The signals present at the outputs from the two output modules 17', 17" are fed to respective input modules 16', 16". In addition, the signal present at the input to the actuator 39 is fed to the input module 16". Using this configuration, each of the faults (1) through (7) may be detected, with the exception of fault (5). In addition, faults (1) and (2) can be localized, and the actuator 39 can be forced to its correct value upon detection of these faults.

Figure 23:
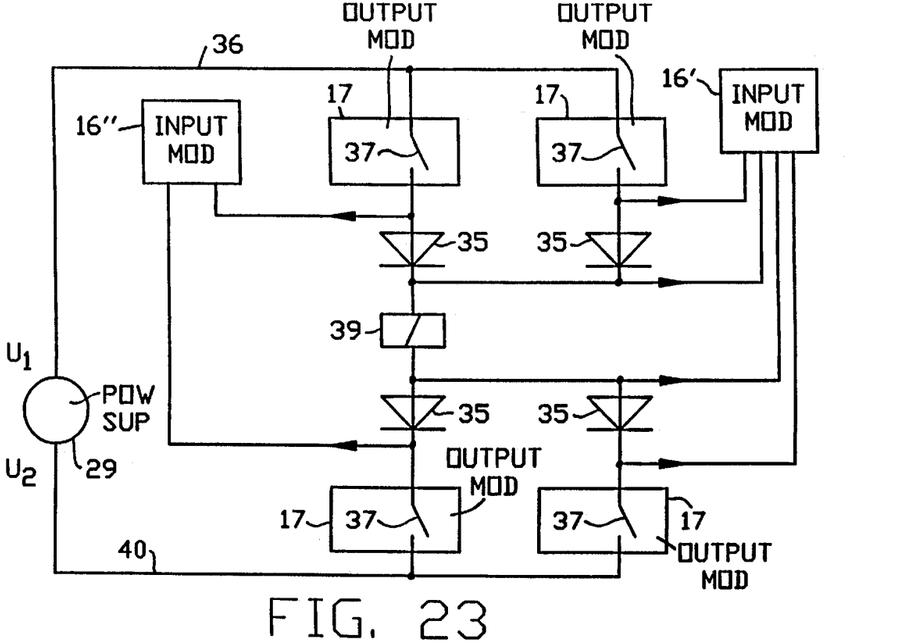

FIG. 23 illustrates a relatively expensive configuration, in which two switches 37 are respectively arranged at an input to and an output from an actuator 39. The potentials present at the input to and output from the actuator 39 are fed to the input module 16'. Using this configuration, each of the faults (1) through (7) may be detected, with the exception of fault (5). In addition, faults (1) to (3) and (7) can be localized. Furthermore, faults (1) to (3) can also be corrected. Thus, this configuration is particularly well-suited to safety related applications.

Still referring to the configuration of FIG. 23, if the load power supplies 29 supply direct current, it is desirable to connect diodes 35 between the actuator 39 and each of the switches 37. The potentials present between the diodes 35 and the switches 37 are also ted to the input modules 16', 16" These modifications make it even easier to localize fault (1).

Figure 24:
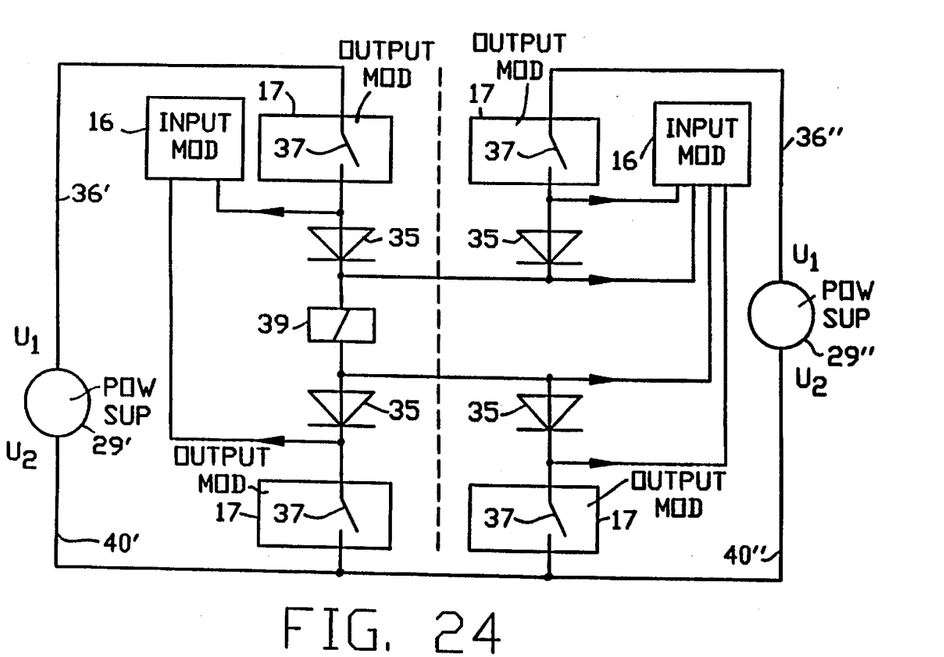

In the configuration illustrated in FIG. 24, two load power supplies 29', 29" are provided, which act upon an actuator 39 through output modules 17 respectively connected to an input to and an output from the actuator 39. Once again, this configuration enables detection of each of the faults (1) through (7), with the exception of fault (5). In addition, faults (2) and (3) can be localized. Furthermore, upon occurrence of faults (1) to (3) or (7), a fault actuating signal can be corrected.

Like the configuration of FIG. 23, if the load power supplies 29', 29" supply direct current, it is desirable to connect diodes 35 between the output modules 17 and the actuator 39, and to measure the potentials present therebetween. This modification permits localization of fault (1).

As was the case in the preceding section, the configurations shown in FIGS. 17–24 are merely intended to be exemplary of the types of configurations that may be used according to the present invention. Many more configurations are possible in practice. Referring back to FIG. 1, the programming unit 1 will store all of the configurations defined to it in the memory 4 along with their corresponding fault behaviors (that is, a listing of the faults which can be detected and/or localized). The totality of the configurations for peripheral input and output channels stored in the memory 4 represents a knowledge base by which the programming unit 1 can identify a configuration exhibiting a particular fault behavior desired by a user.

Configuration Method

According to an embodiment of the present invention, a user wishing to configure a programmable controller 15 (as shown in FIG. 1) to automate a technical process 19 would generally select a plurality of peripheral input and output channels using the keyboard 12 and/or the mouse 11. At a minimum, one input channel and one output channel should be selected. These selections are then stored in the memory 4 by the programming device 1. Based on these entries, the programming device 1 can determine which input and output channels for the technical process 19 must actually be configured.

Once the user has specified the desired peripheral input and output channels, the user is prompted by the video monitor 13 to specify a desired fault behavior (that is, what fault or faults should be handled) for each peripheral channel. The user may specify fault behaviors for each channel individually, or may group together multiple peripheral channels which are to exhibit the same fault behavior and only enter the desired behavior once.

Specification of the desired fault behaviors may be accomplished, for example, by the user first calling up the list or previously-selected peripheral channels or a group of such channels. The programming device 1 may then display to the user on the video monitor 13 a number of fault behaviors available for the channel or channels. For each displayed fault behavior, the user may indicate whether it is desired that the fault be detected, localized, and (for output operations) possibly corrected. The programming unit 1 then compares the specified fault behavior with the fault behaviors associated with the configurations stored in the knowledge base of memory 4. In this way, the programming unit 1 can compile a list of possible configurations for the channel that will exhibit the fault handling capability required by the user.

The available configurations would typically be displayed to the user on the video monitor 13. For any given configuration, the programming unit 1 may display one or more additional items or information to the user, including a factor by which the given configuration is more expensive than a most basic configuration, a fault detection and localization rate for the configuration, and the mean time between failures (MTBF) for the configuration. Using this information, the user is able to specifically select a configuration which most closely meets the user's needs. Alternatively, the programming unit 1 could be setup to always select the simplest configuration that will exhibit the user-requested fault behavior.

Once the configurations for all of the specified peripheral channels have been determined, the programming unit 1 generates a complete configuration for automating the technical process. This complete configuration could then be printed on the attached printer 14 in a form which the person configuring the system will understand. This report would typically indicate the type and number of individual components required for the configuration, along with wiring instructions for the individual modules.

In one embodiment of the present invention, in addition to providing a hard-copy or visual output of the complete configuration, the actual configuration of the programmable controller 15 may be accomplished. For example, if the programming unit 1 is directly coupled to the central unit 15 of the programmable controller, the configuration may be written directly to the memory 22. In other words, the configuration is stored in the automation system. Alternatively, the configuration may be burned into an EPROM which may then be coupled to the programmable controller. In either case, the central unit 18 of the programmable controller is configured. The programmable controller thus knows which peripheral input and output channels corresponds to which modules of the automation system. Assuming the input module 16 and output module 17 are wired properly, the programmable controller will be capable of detecting, localizing, and possibly even correcting faults which may occur in the automation system.

The present invention has been described with reference to specific embodiments. However, persons skilled in the art will readily recognize that various modifications and enhancements are possible. Accordingly, the present invention is intended to encompass all such modifications and enhancements that fall within the scope and spirit of the appended claims.

What is claimed is:

1. A method for configuring a system to automate a technical process, comprising the steps of:
   identifying a peripheral channel;
   specifying a required fault behavior for handling a fault in said peripheral channel;
   determining a configuration of said peripheral channel that provides said required fault behavior; and
   configuring said peripheral channel according to said determined configuration.

2. The configuration method of claim 1, wherein said required fault behavior comprises fault detection.

3. The configuration method of claim 1, wherein said required fault behavior comprises fault localization.

4. The configuration method of claim 1, wherein said specification step comprises displaying a list of possible fault behaviors for said peripheral channel, and selecting a required fault behavior from said list.

5. The configuration method of claim 1, wherein said determination step comprises displaying a list of possible configurations of said peripheral channel capable of providing said required fault behavior, and selecting a desired configuration from said list.

6. The configuration method of claim 1, wherein said identification step comprises simultaneously identifying a plurality of peripheral channels as a group, and said specification step comprises specifying a single required fault behavior for said group of peripheral channels.

7. The configuration method of claim 6, wherein said determination step comprises determining a single configuration for said group or peripheral channels.

8. An apparatus for configuring an automation system, comprising:
   a user interface enabling a user to specify a peripheral channel of the automation system and a required fault behavior for handling a fault in said peripheral channel;
   a memory unit storing a plurality of possible configurations of said peripheral channel and a fault behavior associated with each configuration;
   a processor coupled to said user interface and said memory unit said processor adapted to select a suitable configuration from said memory unit by comparing said required fault behavior to said fault behaviors stored in said memory unit, said processor further adapted to configure said user-specified peripheral channel according to said suitable configuration; and
   an output unit for communicating said suitable configuration to the automation system.

9. The apparatus of claim 8, further comprising a display unit for displaying said possible configurations and associated fault behaviors.

10. A method for configuring an automation system, comprising the steps of:
    identification by a user of a peripheral channel of the automation system, said peripheral channel being communicated to a programming unit;
    specification by said user of a required fault behavior for handling a fault in said peripheral channel, said required fault behavior being communicated to said programming unit;
    determination by said programming unit of a configuration of said peripheral channel capable of providing said required fault behavior, said determination made using information stored in a knowledge base; and
    configuration by said programming unit of said peripheral channel according to said configuration.

11. The configuration method of claim 10, wherein said required fault behavior comprises fault detection.

12. The configuration method of claim 11, wherein said required fault behavior further comprises fault localization.

13. The configuration method of claim 12, wherein said specification step comprises displaying a list of possible fault behaviors for said peripheral channel to said user, and selection by said user of said required fault behavior from said list.

14. The configuration method of claim 13, wherein said determination step comprises displaying a list of possible configurations of said peripheral channel to said user, each of said possible configurations capable of providing said required fault behavior, and selection by said user of a configuration from said list.

15. The configuration method of claim 14, wherein said identification step comprises simultaneous identification by said user of a plurality of peripheral channels, and said specification step comprises specification by said user of a single required fault behavior applicable to said plurality of peripheral channels.

16. The configuration method of claim 15, wherein said determination step comprises determination by said programming unit of a single configuration for said plurality peripheral channels.

* * * * *